United States Patent
Byun et al.

(10) Patent No.: US 7,099,100 B2
(45) Date of Patent: Aug. 29, 2006

(54) APPARATUS AND METHOD FOR CONTROLLING HEAD LOADING IN DISK DRIVE

(75) Inventors: Yong-kyu Byun, Yongin-si (KR); Chung-Il Chun, Seongnam-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 39 days.

(21) Appl. No.: 10/887,913

(22) Filed: Jul. 12, 2004

(65) Prior Publication Data

US 2005/0068661 A1    Mar. 31, 2005

(30) Foreign Application Priority Data

Sep. 25, 2003    (KR) ...................... 10-2003-0066499

(51) Int. Cl.
    *G11B 15/18* (2006.01)
(52) U.S. Cl. ....................................................... 360/69
(58) Field of Classification Search ...................... None
    See application file for complete search history.

(56) References Cited

U.S. PATENT DOCUMENTS 6,560,066 B1 *    5/2003    Imai et al. ............... 360/97.02

FOREIGN PATENT DOCUMENTS

| JP | 2001-216753 A | 8/2001 |
| JP | 2003-217244 A | 7/2003 |

* cited by examiner

*Primary Examiner*—Hoa T. Nguyen
*Assistant Examiner*—Mitchell Slavitt
(74) *Attorney, Agent, or Firm*—Sughrue Mion, PLLC

(57) ABSTRACT

An apparatus and method for controlling head loading in a disk drive including a displacement measuring unit measuring a vertical displacement of a disk, a rotational angle detecting unit detecting a rotational angle of a spindle motor, and a controller controlling the movement of an actuator to load a head on the disk while a vertical displacement of a portion of the disk on which the head is loaded is decreasing so that the disk separates farther from a position on which the head is parked. Therefore, the possibility of collision between the head and the disk during head loading is reduced, thereby preventing damage to the head and disk and improving the reliability of the disk drive.

25 Claims, 5 Drawing Sheets

APPARATUS AND METHOD FOR CONTROLLING HEAD LOADING IN DISK DRIVE

BACKGROUND OF THE INVENTION

This application is based upon and claims the benefit of priority from Korean Patent Application No. 2003-66499, filed on Sep. 25, 2003, in the Korean Intellectual Property Office, the disclosure of which is incorporated herein in its entirety by reference.

1. Field of the Invention

The invention relates to a disk drive, and more particularly, to an apparatus and method for controlling head loading in a disk drive, which can reduce the possibility of collision between a head and a rotating disk when the head is loaded onto the rotating disk.

2. Description of the Related Art

A hard disk drive (HDD) is a computer data storage device, which reproduces data stored on disks or records data on the disks using a read/write head. In the HDD, a head is moved to a desired position by an actuator while flying above a data recording surface of a disk at a predetermined height.

FIG. 1 is a schematic plan view of a related art HDD, and FIG. 2 is an enlarged view of a ramp and a suspension of an actuator in the HDD of FIG. 1.

Referring to FIGS. 1 and 2, the HDD includes a base member 10, a spindle motor 12 installed on the base member 10, a disk 20 fixedly mounted on the spindle motor 12, and an actuator 30. Actuator 30 moves a slider 34, on which a read/write head 35 for data reproduction and recording is mounted, to a predetermined position on the disk 20. The actuator 30 includes a pivot bearing 31 installed on the base member 10, a swing arm 32 rotatably coupled to the pivot bearing 31, a suspension 33, which is installed at one end of the swing arm 32 and elastically supports the slider 34 toward a surface of the disk 20, and a voice coil motor (VCM), which rotates the swing arm 32. The VCM includes a VCM coil 37 coupled to the other end of the swing arm 32, and a magnet 38 disposed above and below the VCM coil 37 to face the VCM coil 37.

The VCM rotates the swing arm 32 in a direction according to Fleming's left-hand rule due to interaction between current input to the VCM coil 37 and a magnetic field formed by the magnet 38. That is, when the HDD is turned on and the disk 20 begins to rotate in an arrow direction D, the VCM rotates the swing arm 32 counterclockwise (in an arrow direction A) to move the slider 34, on which the read/write head 35 is mounted, to a position on a data recording surface of the disk 20. The slider 34 flies above the surface of the disk 20 at a predetermined height due to a lift force generated by the rotating disk 20. At this time, the head 35 mounted on the slider 34 reproduces or records data from or on the data recording surface of the disk 20.

Meanwhile, when the HDD does not operate and the disk 20 does not rotate, the head 35 should be parked in a position other than the data recording surface of the disk 20 so as not to touch the data recording surface of the disk 20. For this, a ramp 40 is installed outside the disk 20, and the suspension 33 has an end-tab 36 protruding therefrom such that the end-tab 36 is seated on a support surface 41 of the ramp 40.

When the HDD is turned off and the disk 20 stops rotating, the VCM rotates the swing arm 32 clockwise (in an arrow direction B). Accordingly, the end-tab 36 is moved to be parked on the support surface 41 of the ramp 40. Through this, the head 35 is unloaded from the disk 20. On the contrary, when the HDD is turned on and the disk 20 begins to rotate, the end-tab 36 is moved from the support surface 41 of the ramp 40 and the head 35 is loaded on the disk 20 due to the counterclockwise rotation of the swing arm 32 as described above.

In the meantime, an actuator latch 50 locks the actuator 30 in any desired place so that while the read/write head 35 is parked on the ramp 40, the actuator 30 cannot rotate unexpectedly due to external impact or vibration applied to the HDD.

FIG. 3A is a cross-sectional view of the HDD of FIG. 1 in a circumferential direction of the disk, for explaining a pitch static angle (PSA) of the slider, and FIG. 3B is a cross-sectional view of the HDD of FIG. 1 in a radial direction of the disk, for explaining a roll static angle (RSA) of the slider.

Referring to FIGS. 3A and 3B, in the HDD, when the head 35 is moved from the ramp 40 and then is loaded onto the disk 20, the slider 34 on which the head 35 is mounted may collide with the surface of the disk 20. In order to avoid the collision, it is necessary to form a stable air bearing between the disk 20 and the slider 34 with the head 35 thereon. However, during the short head loading, very complex hydrodynamic and vibrational phenomena occur between the slider 34 and the disk 20. In particular, static angles, such as the pitch static angle (PSA) $\theta_P$ and the roll static angle (RSA) $\theta_R$, of the slider 34 formed while the head 35 is moved from the ramp 40 to the disk 20 have a great influence on the collision between the slider 34 and the disk 20. Here, as shown in FIG. 3A, the PSA $\theta_P$ is an inclination of the slider 34 in a rotational direction of the disk 20 with respect to the surface of the disk 20. As shown in FIG. 3B, the RSA $\theta_R$ is an inclination of the slider 34 in a radial direction of the disk 20 with respect to the surface of the disk 20. It is known through many studies that when the PSA $\theta_P$ and RSA $\theta_R$ have positive values, the possibility of collision between the slider 34 and the disk 20 decreases. In further detail, as shown in FIG. 3A, if the PSA $\theta_P$ has a positive value, more air is introduced into a space between the slider 34 and the disk 20, and accordingly, a stronger air bearing is formed in a smoother manner. Thus, the possibility of collision between the slider 34 and the disk 20 is reduced. Similarly, as shown in FIG. 3B, if RSA $\theta_R$ has a positive value when the slider 34 is moved from the ramp 40 to the space above the disk 20, the possibility of collision between the slider 34 and the disk 20 is reduced.

However, even though the PSA $\theta_P$ and RSA $\theta_R$ have positive values, the collision possibility between the slider 34 and the disk 20 may increase depending on the state of the disk 20. That is, the collision possibility varies according to a vertical displacement of a portion of the disk 20 on which the slider 34 is loaded.

FIG. 4 is a graph illustrating a vertical displacement of the disk, for explaining collision between the head and the disk when the head is loaded.

Referring to FIG. 4, when the disk rotates, the disk vibrates. The amplitude of vibration is highest at an edge portion of the disk. The vibration of the disk is caused by deflection of the disk, poor flatness of the disk, and air flow in the HDD. The vibration is periodically repeated whenever the disk rotates. The repeated vibration is called Repeatable Runout (RRO). Because of the RRO, the edge portion of the disk has a vertical displacement repeated over time.

In the related art, the vertical displacement of the disk during head loading has not been considered. Accordingly, as shown in FIG. 4, if the head is loaded on the disk while the vertical displacement of the portion of the disk on which the disk is loaded becomes increasingly greater, a distance between the head and the disk is drastically reduced and thus time is too short to generate sufficient air bearing between the slider on which the head is mounted and the disk. As a result, the collision possibility between the head and the disk increases greatly and also, the impact force applied to the head increases.

As described above, if the head and the disk repeatedly collide with each other, the head and the surface of the disk may be damaged, thereby deteriorating the reliability of the HDD.

SUMMARY OF THE INVENTION

The invention provides an apparatus and method for controlling a read/write head during loading on a disk in a disk drive while a vertical displacement of the disk is decreasing and the disk becomes farther from a surface of a ramp on which the head is parked, so as to reduce the possibility of collision between the head and the disk.

According to an aspect of the invention, there is provided an apparatus for controlling head loading in a hard disk drive that includes a spindle motor that rotates a disk for data storage, an actuator that moves a read/write head to a data recording surface of the disk, and a ramp on which the head is parked when not in use, the apparatus comprising: a displacement measuring unit that measures a vertical displacement of the disk; a rotational angle detecting unit that detects a rotational angle of the spindle motor; and a controller that controls the movement of the actuator to load the head on the disk while a vertical position of a portion of the disk on which the head is to be loaded is decreasing so that the disk separates farther from the ramp.

The displacement measuring unit may include: a cantilever spaced from an edge portion of the disk and to be deflected according to a distance from the disk; and a strain gauge attached to the cantilever to measure a deflection of the cantilever.

The cantilever may be installed on the base member or the cover member to face the data recording surface of the disk.

A plurality of hall sensors arranged on the spindle motor may be used as the rotational angle detecting unit.

The rotational angle detecting unit may detect the rotational angle of the spindle motor based on a back electromotive force generated by the spindle motor.

According to another aspect of the invention, there is provided a method of controlling head loading in a hard disk drive that includes a spindle motor that rotates a disk for data storage, an actuator that moves a read/write head to a data recording surface of the disk, and a ramp on which the head is parked when not in use, the method comprising: measuring a vertical displacement of the disk with respect to a rotational angle of the spindle motor; detecting the rotational angle of the spindle motor; and controlling the movement of the actuator to load the head on the disk while a vertical position of a portion of the disk on which the head is to be loaded is decreasing so that the disk separates farther from the ramp.

The disk vertical displacement measuring step may include measuring a vertical displacement of an edge portion of the disk while the disk rotates.

Measuring a vertical displacement of the disk may include detecting a deflection of a cantilever spaced apart from an edge portion of the disk.

The spindle motor rotational angle detecting step may include detecting signals output from a plurality of hall sensors arranged on the spindle motor, or a back electromotive force signal output from the spindle motor.

The actuator rotation controlling step may include controlling the time and speed at which the actuator is moved, and controlling the head to be loaded on the disk within the first half of a time period wherein the disk separates farther from the ramp.

According to another aspect of the invention, there is provided a disk drive, comprising: a rotatable disk; an actuator that supports and moves a read/write head; and a controller that controls movement of the actuator, wherein the controller moves the actuator so that the head is loaded on a first portion of the disk while the first portion of the disk is moving axially away from the actuator.

The disk drive may further comprise a displacement measuring unit that measures axial displacement of the disk, and a rotational angle detecting unit that detects a rotational angle of the disk.

The controller may map axial displacements of the disk corresponding to rotational angles thereof, and move the actuator with respect to the mapped axial displacements corresponding to the detected rotational angle of the disk, or move the actuator with respect to predetermined axial displacements corresponding to the detected rotational angle of the disk.

According to another aspect of the invention, there is provided a method of controlling a disk drive, comprising: rotating a disk; and controlling movement of an actuator that supports and moves a read/write head so that the head is loaded on a first portion of the disk while the first portion of the disk is moving axially away from the actuator.

The method of controlling a disk drive may further comprise measuring axial displacement of the disk, and detecting a rotational angle of the disk.

Controlling the movement of the actuator may comprise mapping axial displacements of the disk corresponding to rotational angles thereof, and moving the actuator with respect to the mapped axial displacements corresponding to the detected rotational angle of the disk, or moving the actuator with respect to predetermined axial displacements corresponding to the detected rotational angle of the disk.

BRIEF DESCRIPTION OF THE DRAWINGS

The above and other objects, features and advantages of the invention will become more apparent by describing in detail exemplary embodiments thereof with reference to the attached drawings in which.

DETAILED DESCRIPTION OF THE INVENTION

Figure 1:
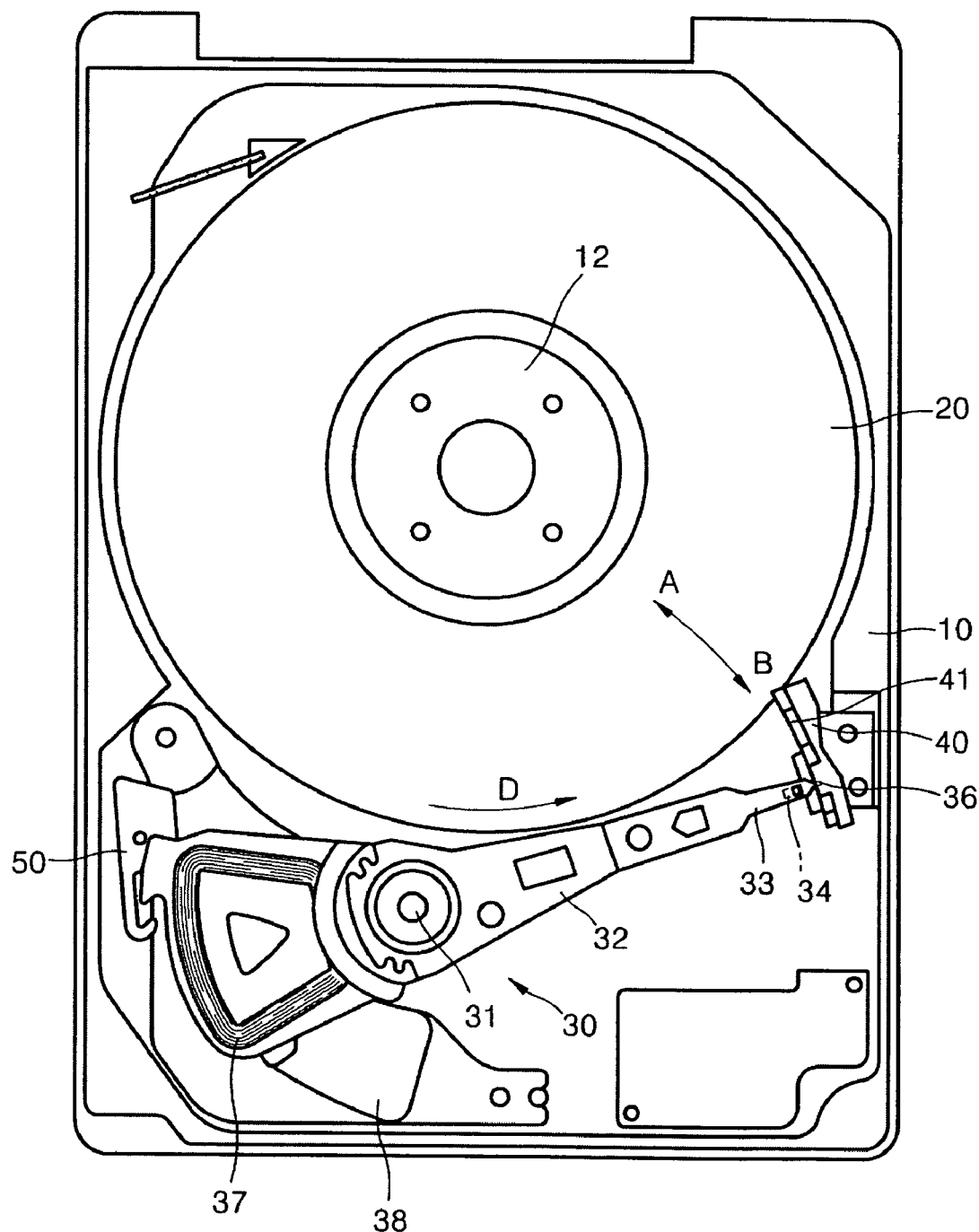
FIG. 1 is a schematic plan view of a related art hard disk drive (HDD)
Figure 2:
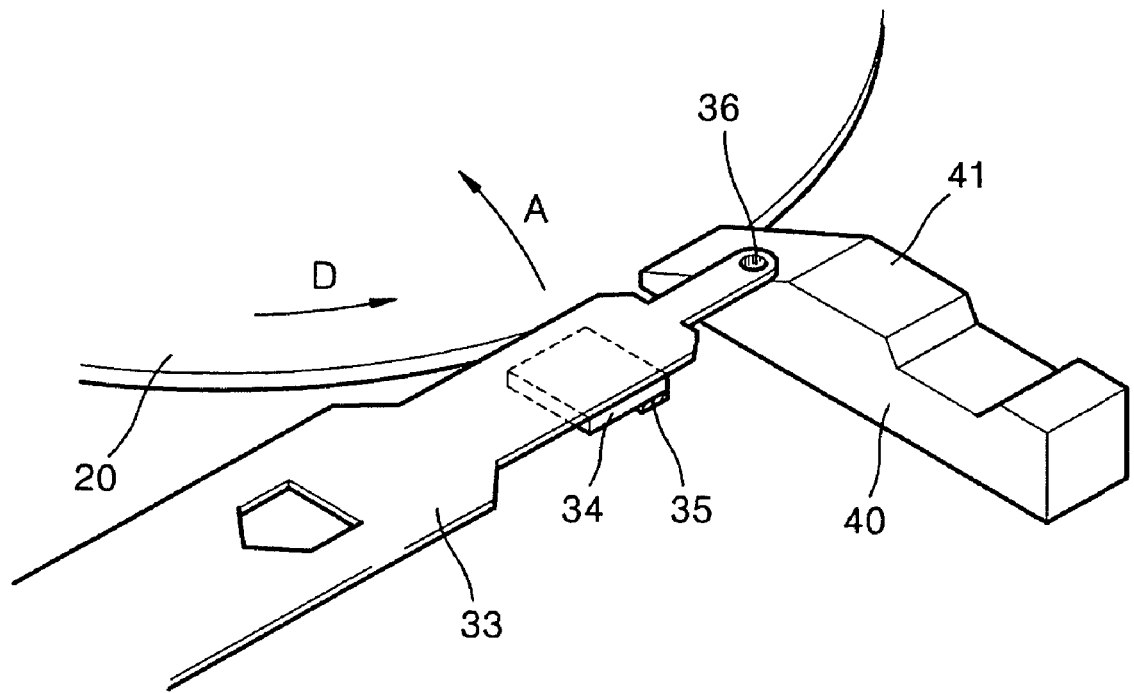
FIG. 2 is an enlarged perspective view of a ramp and a suspension of an actuator in the HDD of FIG. 1.
Figure 3A:
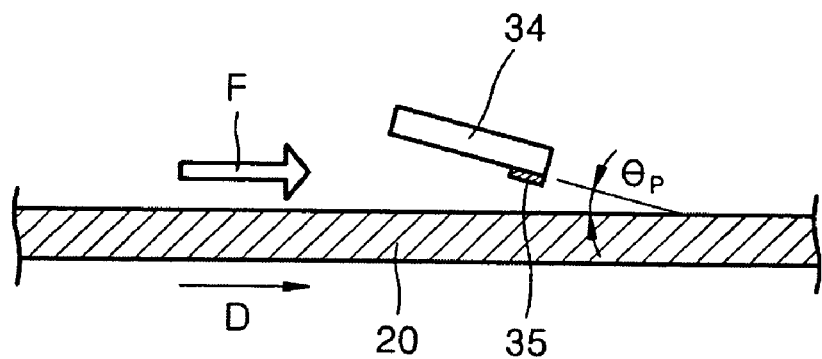
FIG. 3A is a cross-sectional view of the HDD of FIG. 1 in a circumferential direction of a disk, for explaining a pitch static angle (PSA) of a slider.
Figure 3B:
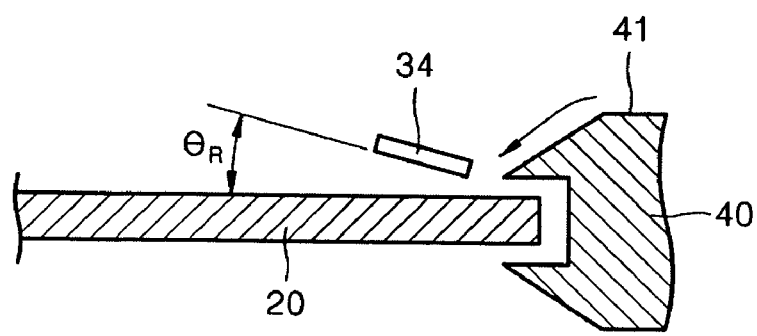
FIG. 3B is a cross-sectional view of the HDD of FIG. 1 in a radial direction of the disk, for explaining a roll static angle (RSA) of the slider.
Figure 4:
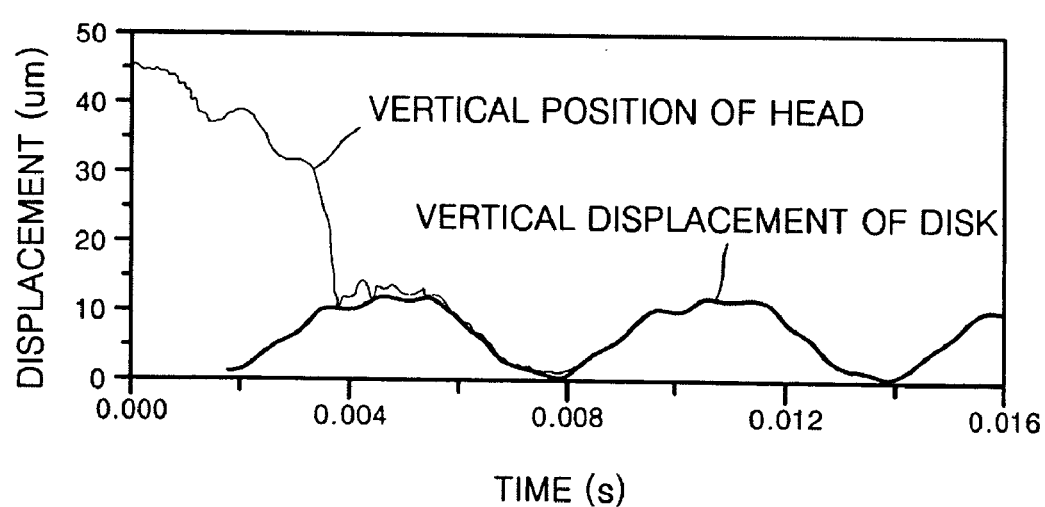
FIG. 4 is a graph illustrating a vertical displacement of the disk, for explaining collision between a head and the disk when the head is loaded.

The invention will now be described more fully with reference to the accompanying drawings, in which exemplary embodiments of the invention are shown. The described exemplary embodiments are intended to assist the understanding of the invention, and are not intended to limit the scope of the invention in any way. Throughout the drawings, whenever the same element reappears in subsequent drawings, it is denoted by the same reference numeral.

Figure 5:
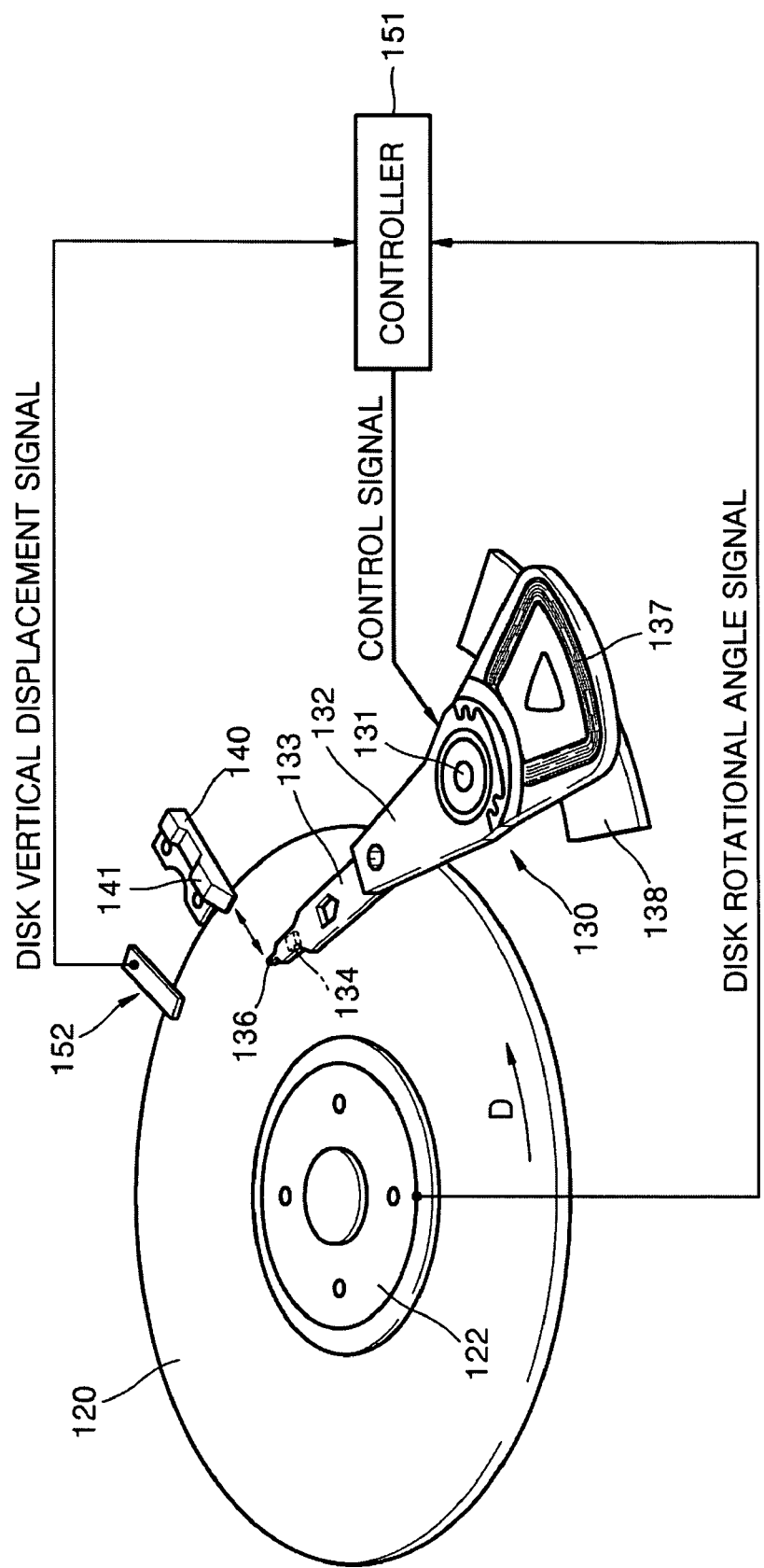
FIG. 5 is a schematic perspective view of an apparatus for controlling head loading according to an exemplary embodiment of the invention.
Figure 6:
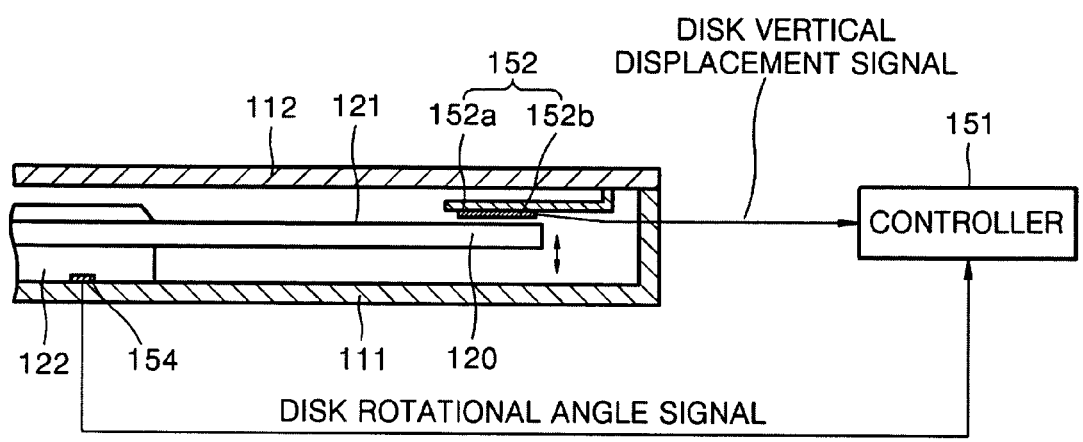
FIG. 6 is a cross-sectional view of a displacement measuring sensor of the apparatus shown in FIG. 5.
Figure 7:
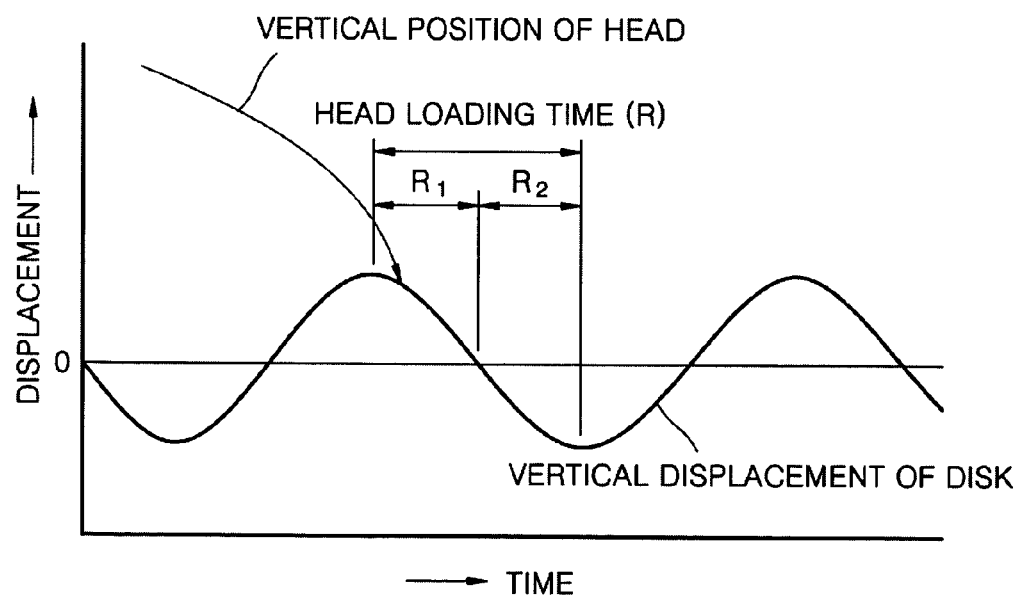
FIG. 7 is a graph illustrating a head loading time and a vertical displacement of a portion of a disk, on which a head is loaded, over time, wherein the vertical displacement is measured by the displacement measuring sensor shown in FIG. 5.

FIG. 5 is a schematic perspective view of an apparatus for controlling head loading in a disk drive according to an exemplary embodiment of the invention, FIG. 6 is a cross-sectional view of a displacement measuring sensor in the apparatus of FIG. 5, and FIG. 7 is a graph illustrating a head loading time and a vertical displacement of a portion of a disk, on which a head is loaded, over time, wherein the vertical displacement is measured by the displacement measuring sensor shown in FIG. 5.

Referring to FIGS. 5 and 6, the apparatus for controlling head loading according to the invention is employed in a disk drive that reproduces data stored in a disk 120 or records data on the disk 120.

The disk drive includes a base member 111, a cover member 112, a spindle motor 122 for rotating the disk 120, an actuator 130, a ramp 140, and the apparatus for controlling head loading according to the invention.

The spindle motor 122 is installed on the base member 111 of the disk drive. The disk 120 is installed in a hub of the spindle motor 122 and rotates with the hub.

The actuator 130 moves a read/write head for data reproduction and recording to a predetermined position of the disk 120. The actuator 130 includes a swing arm 132, a slider 134 on which the read/write head is mounted, a suspension 133, and a voice coil motor (VCM). The swing arm 132 is rotatably coupled to a pivot bearing 131 that is installed on the base member 111. The suspension 133 is coupled to a leading end portion of the swing arm 132 and elastically supports the slider 134 in a proper orientation relative to a surface of the disk 120. An end-tab 136 protrudes from a distal end of the suspension 133 and may be seated on a support surface 141 of the ramp 140.

The VCM provides a force for rotating the swing arm 132. The VCM rotates the swing arm 132 in a direction according to Fleming's left hand rule due to interaction between current input to a VCM coil 137 and an electric field formed by a magnet 138. The VCM coil 137 is coupled to a rear end portion of the swing arm 132, and the magnet 138 is disposed above and below the VCM coil 137 to face the VCM coil 137. To be more specific, when the disk drive is turned on and the disk 120 begins to rotate in an arrow direction D, the VCM rotates the swing arm 132 counterclockwise and loads the head on a data recording surface 121 of the disk 120. On the contrary, when the disk drive is turned off and the disk 120 stops rotating, the VCM rotates the swing arm 132 clockwise and removes the head from the disk 120. When the head is removed from the data recording surface 121 of the disk 120, it is parked on the ramp 140 that is installed on the base member 111 near an outer circumference of the disk 120. Specifically, when the disk 120 stops rotating, the swing arm 132 rotates clockwise by the VCM, and then the end-tab 136 protruding from the end portion of the suspension 133 is moved toward the ramp 140 and is parked on the support surface 141 of the ramp 140.

In the meantime, the above explanation has been made based on a case where a top surface of the disk 120 is the data recording surface 121. In this case, the slider 134 on which the head is mounted is positioned above the disk 120, and the head is loaded on the data recording surface 121 of the disk 120 after being lowered from the support surface 121 of the ramp 140.

In a general disk drive, however, a bottom surface of the disk 120 may be the data recording surface, to the contrary of the above construction. In this case, the slider on which the head is mounted and the support surface of the ramp are positioned below the disk 120. The head is loaded on the data recording surface of the disk 120 after being lifted from the support surface of the ramp using an elastic force of the suspension.

The apparatus for controlling head loading according to the invention can be applied to both cases. However, to avoid a repeated explanation, the apparatus will be explained on the basis of the case where the top surface of the disk 120 is the data recording surface 121.

The head loading control apparatus for the disk drive according to the invention is characterized in that the head is controlled to be loaded on the data recording surface 121 of the disk 120 while a vertical displacement of the disk 120 is decreasing and the disk 120 separates farther from a surface of the ramp 140 on which the head is parked.

To do that, the apparatus includes: a displacement measuring unit, which measures the vertical displacement of the disk 120: a rotational angle detecting unit, which detects a rotational angle of the spindle motor 122: and a controller 151, which controls the rotation of the actuator 130 according to the rotational angle of the spindle motor 122 and the vertical displacement of the disk 120.

The displacement measuring unit measures a vertical displacement of an edge portion of the disk due to a repeatable runout while the disk 120 rotates. Various well-known sensors, such as optical sensors, as well as a displacement measuring sensor 152 utilizing a strain gauge 152b, may be used as the displacement measuring unit.

Specifically, the displacement measuring sensor 152 includes a cantilever 152a and the strain gauge 152b.

The cantilever 152a has one end fixed to the cover member 112 that faces the data recording surface 121 of the disk 120 and the other end spaced apart from a surface of the edge portion of the disk 120 by a predetermined distance. The cantilever 152a is deflected in response to a vertical vibration of the edge portion of the disk 120 such that the other end of the cantilever 152a vibrates in a vertical direction. In other words, when the edge portion of the disk 120 vibrates in a vertical direction, the distance between the disk 120 and the cantilever 152a is changed, and accordingly, an air pressure between the disk 120 and the cantilever 152 is also changed. Therefore, the cantilever 152a is slightly deflected in the vertical direction due to the change in air pressure.

The strain gauge 152b is attached to the cantilever 152a to measure the deflection of the cantilever 152a. The strain gauge 152b is attached to a bottom surface of the cantilever 152a, that is, a surface facing the disk 120, as shown in FIG. 6. Also, the strain gauge 152b may be attached to a top surface of the cantilever 152a. The strain gauge 152b attached to the cantilever 152a converts the deflection of the cantilever 152a into a corresponding electrical signal.

Since the vertical vibration at the edge portion of the disk 120 is periodically repeated while the disk 120 rotates, the vertical deflection of the cantilever 152a coincides with the vibration of the disk 120 and is periodically repeated. Further, the deflection of the cantilever 152a is almost proportional to the vertical displacement of the disk 120. Hence, the vertical displacement of the edge portion of the disk 120 can be calculated using a signal output from the strain gauge 152b.

The cantilever 152a may be disposed on a side of disk 120 opposite to the data recording surface 121. However, the cantilever 152a may provide better data when disposed above the disk 120 to face the data recording surface 121 of the disk 120 because the thickness of the disk 120 may not be uniform along a circumferential direction thereof. Thus, measuring the vertical displacement of the edge portion of the disk 120 from the side of the disk 120 with the data recording surface 121 may be a more precise way of obtaining the vertical displacement of the data recording surface 121. Therefore, at least in this exemplary embodiment, the cantilever 152a is installed on the cover member 112 that faces the data recording surface 121 of the disk 120.

As previously mentioned, when the data recording surface 121 is the bottom surface of the disk 120, the cantilever 152a may also be disposed below the disk 120. In this case, the cantilever 152a is fixedly installed on the base member 111.

The displacement measuring sensor 152 may be located in any place in the circumferential direction of the disk 120. As stated above, since the vibration of the disk 120 is periodically repeated, even though the vertical displacement of the disk 120 is measured in any position in the circumferential direction of the disk 120, the vertical displacement of the head-loading portion of the disk 120 can be obtained.

As the rotational angle detecting unit, a plurality of hall sensors 154 arranged on the spindle motor 122 can be used. For example, four hall sensors 154 are arranged on the spindle motor 122, and detect a position, namely, a rotational angle, and a rotational speed, of a rotator of the spindle motor 122. Accordingly, the rotational angle of the spindle motor 122 can be obtained from signals output from the hall sensors 154. The rotational angle of the spindle motor 122 is equal to a rotational angle of the disk 120.

Alternatively, the rotational angle of the spindle motor 122 may be detected based on a back electromotive force that is generated by the spindle motor 122. When the spindle motor 122 rotates, the back electromotive force is generated. Since waveforms of back electromotive forces in u, v, and w phases of the spindle motor 122 have a phase difference of 120°, the position, namely, the rotational angle, of the rotator of the spindle motor 122 can be obtained using a back electromotive force signal.

The controller 151 receives a spindle motor rotational angle signal from the rotational angle detecting unit and receives a disk vertical displacement signal from the displacement measuring sensor 152, and calculates the vertical displacement of the head-loading portion of the disk 120 with respect to the rotational angle of the spindle motor 122 using the received signals. The controller 151 controls the rotation of the actuator 130 so that the head can be loaded on the data recording surface 121 of the disk 120 while the vertical displacement of the disk 120 with respect to the rotational angle of the spindle motor 122 is decreasing and the disk separates farther from the head-parked position, namely, from the support surface 141 of the ramp 140. The function of the controller 151 will be explained below in further detail.

A method of controlling head loading in the apparatus constructed as above will now be described with reference to FIG. 7.

First, the vertical displacement of the disk 122 with respect to the rotational angle of the spindle motor 122 is measured. To be specific, the rotational angle detecting unit detects the rotational angle of the spindle motor 122, and the displacement measuring sensor 152 measures the vertical displacement of the disk 120. Subsequently, the controller 151 obtains the vertical displacement of the head-loading portion of the disk 120 with respect to the rotational angle of the spindle motor 122 using the spindle motor rotational angle signal and the disk vertical displacement signal, and stores data on the obtained vertical displacement of the disk 120. The obtained vertical displacement of the head-loading portion of the disk 120 increases and decreases periodically, as shown in FIG. 7.

The vertical displacement of the disk 120 is measured just once after the disk drive is assembled. This is because the vertical displacement of the disk 120 is periodically repeated while the spindle motor 122 rotates.

Next, when the disk 120 begins to rotate, the rotational angle of the spindle motor 122 is detected before the head is moved from the ramp 140 to be loaded on the data recording surface 121 of the disk 120. As described above, the rotational angle of the spindle motor 122 can be detected using the signals output from the hall sensors 154 arranged on the spindle motor 122 or the back electromotive force signal output from the spindle motor 122. Once the rotational angle of the spindle motor 122 is detected, the vertical displacement of the head-loading portion of the disk 120 with respect to the rotational angle of the spindle motor 122 can be obtained from the data on the vertical displacement of the disk 120, which is stored in the controller 151.

Next, the controller 151 controls the rotation of the actuator 130 so that the head is loaded on the data recording surface of the disk 120 within a head-loading time R, shown in FIG. 7, while the vertical displacement of the head-loading portion of the disk 120 decreases. To be more specific, the controller 151 controls a time when the actuator 130 rotates and a speed at which the actuator 130 rotates so that the head can be loaded within the head loading time R. For this, the actuator 130 begins to rotate before the beginning of the head loading time R in consideration of the rotational speed of the actuator 130. This is because a certain amount of time is required before the head is moved from the ramp 140 and reaches the head-loading portion of the disk 120. Accordingly, the time when the actuator 130 rotates and the speed at which the actuator 130 rotates should be determined so as to ensure that the vertical displacement of the disk 120 is decreasing when the head is loaded on the disk 120.

As described above, if the head is loaded while the vertical displacement of the disk 120 is decreasing, that is, while the disk 20 becomes farther from the head-parked surface of the ramp 140, the possibility of collision between the head and the disk 120 during head loading is drastically reduced. Particularly, when the head loading time R is divided into a first half $R_1$ and a second half $R_2$, the head is loaded on the disk 120 within the first half $R_1$. This is because since a vertical position of the loaded head and the vertical displacement of the disk 120 are formed in the same direction, sufficient time is provided to generate air bearing between the disk 120 and the slider 134 on which the head is mounted. Even though collision between the head and the disk 120 may still occur, since the head and the disk 120 are moved in the same direction, the impact force applied to the head is less than that in the conventional art.

As described above, the head is loaded while the vertical displacement of the head-loading portion of the disk is decreasing and the disk separates farther from the head-parked surface of the ramp, thereby drastically reducing the collision possibility between the head and the disk. As a result, damage to the head and the disk is avoided, the life span of the head and the disk increases, and the reliability of the disk drive is enhanced.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. An apparatus for controlling head loading in a disk drive that includes a spindle motor that rotates a disk for data storage, an actuator that moves a read/write head to a data recording surface of the disk, and a ramp on which the head is parked when not in use, the apparatus comprising:
   a displacement measuring unit that measures a vertical displacement of the disk;
   a rotational angle detecting unit that detects a rotational angle of the spindle motor; and
   a controller that controls the movement of the actuator to load the head on the disk while a vertical position of a portion of the disk on which the head is to be loaded is decreasing so that the disk separates farther from the ramp.

2. The apparatus of claim 1, wherein the displacement measuring unit comprises:
   a cantilever spaced from an edge portion of the disk to be deflected according to a distance from the disk; and
   a strain gauge attached to the cantilever to measure a deflection of the cantilever.

3. The apparatus of claim 2, wherein the cantilever faces the data recording surface of the disk.

4. The apparatus of claim 3, wherein the disk drive further includes a base member and a cover member to protect the disk, and the cantilever is installed on the respective one of the base member or the cover member that faces the data recording surface of the disk.

5. The apparatus of claim 1, wherein the rotational angle detecting unit comprises a plurality of hail sensors arranged on the spindle motor.

6. The apparatus of claim 1, wherein the rotational angle detecting unit detects the rotational angle of the spindle motor based on a back electromotive force generated by the spindle motor.

7. A method of controlling head loading in a disk drive that includes a spindle motor that rotates a disk for data storage, an actuator that moves a read/write head to a data recording surface of the disk, and a ramp on which the head is parked when not is use, the method comprising:
   measuring a vertical displacement of the disk with respect to a rotational angle of the spindle motor;
   detecting the rotational angle of the spindle motor; and
   controlling the movement of the actuator to load the head on the disk while a vertical position of a portion of the disk on which the head is to be loaded is decreasing so that the disk separates farther from the ramp.

8. The method of claim 7, wherein measuring a vertical displacement comprises measuring a vertical displacement of an edge portion of the disk while the disk rotates.

9. The method of claim 7, wherein measuring a vertical displacement of the disk comprises detecting a deflection of a cantilever spaced apart from an edge portion of the disk.

10. The method of claim 7, wherein detecting the rotational angle of the spindle motor comprises detecting signals output from a plurality of hall sensors arranged on the spindle motor.

11. The method of claim 7, wherein detecting the rotational angle of the spindle motor comprises detecting a back electromotive force signal output from the spindle motor.

12. The method of claim 7, wherein controlling the movement of the actuator comprises controlling a time when the actuator is moved and a speed at which the actuator is moved.

13. The method of claim 7, wherein controlling the movement of the actuator comprises controlling the head to be loaded on the disk within the first half of a time period wherein the disk separates farther from the ramp.

14. A disk drive, comprising: a rotatable disk; an actuator that supports and moves a read/write head; and a controller that controls movement of the actuator, wherein the controller moves the actuator so that the head is loaded on a first portion of the disk while the first portion of the disk is moving in a direction that is axially away from the actuator.

15. The disk drive of claim 14, further comprising a displacement measuring unit that measures axial displacement of the disk.

16. The disk drive of claim 15, further comprising a rotational angle detecting unit that detects a rotational angle of the disk.

17. The disk drive of claim 16, wherein the controller maps axial displacements of the disk corresponding to rotational angles thereof, and moves the actuator with respect to the mapped axial displacements corresponding to the detected rotational angle of the disk.

18. The disk drive of claim 14, further comprising a rotational angle detecting unit that detects a rotational angle of the disk.

19. The disk drive of claim 18, wherein the controller moves the actuator with respect to predetermined axial displacements corresponding to the detected rotational angle of the disk.

20. A method of controlling a disk drive, comprising:
    rotating a disk; and
    controlling movement of an actuator that supports and moves a read/write head so that the head is loaded on a first portion of the disk while the first portion of the disk is moving in a direction that is axially away from the actuator.

21. The method of controlling a disk drive of claim 20, further comprising measuring axial displacement of the disk.

22. The method of controlling a disk drive of claim 21, further comprising detecting a rotational angle of the disk.

23. The method of controlling a disk drive of claim 22, wherein controlling movement of the actuator comprises mapping measured axial displacements of the disk corresponding to rotational angles thereof, and moving the actuator with respect to the mapped axial displacements corresponding to the detected rotational angle of the disk.

24. The method of controlling a disk drive of claim 20, further comprising detecting a rotational angle of the disk.

25. The method of controlling a disk drive of claim 24, wherein controlling movement of the actuator comprises moving the actuator with respect to predetermined axial displacements corresponding to the detected rotational angle of the disk.

* * * * *